US010108361B2

(12) United States Patent
Itoh

(10) Patent No.: US 10,108,361 B2
(45) Date of Patent: Oct. 23, 2018

(54) INFORMATION PROCESSING APPARATUS FOR STORING DATA IN CLOUD ENVIRONMENT, TERMINAL DEVICE, AND STORAGE METHOD

(71) Applicant: LENOVO (Singapore) PTE. LTD., New Tech Park (SG)

(72) Inventor: Hiroshi Itoh, Sagamihara (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 212 days.

(21) Appl. No.: 15/150,857

(22) Filed: May 10, 2016

(65) Prior Publication Data
US 2016/0335017 A1    Nov. 17, 2016

(30) Foreign Application Priority Data

May 11, 2015  (JP) .................................. 2015-96725

(51) Int. Cl.
| G06F 3/06  | (2006.01) |
| H04L 9/30  | (2006.01) |
| H04L 9/14  | (2006.01) |
| G06Q 30/04 | (2012.01) |

(52) U.S. Cl.
CPC ............ G06F 3/0623 (2013.01); G06F 3/067 (2013.01); G06F 3/0643 (2013.01); G06F 3/0683 (2013.01); H04L 9/14 (2013.01); H04L 9/30 (2013.01); G06Q 30/04 (2013.01)

(58) Field of Classification Search
CPC ...... G06F 3/0623; G06F 3/0683; G06F 3/067; G06F 3/0643; H04L 9/30; H04L 9/14; G06Q 30/04

See application file for complete search history.

(56) References Cited

U.S. PATENT DOCUMENTS

| 9,483,486 | B1 * | 11/2016 | Christiaens | ........... G06F 3/0641 |
| 2007/0174363 | A1 * | 7/2007 | Courtney | ............ G06F 11/1076 |
| 2011/0022640 | A1 * | 1/2011 | Franco | .................... H04L 51/00 |
| | | | | 707/802 |
| 2015/0052354 | A1 * | 2/2015 | Purohit | ............. G06F 17/30194 |
| | | | | 713/165 |
| 2017/0048021 | A1 * | 2/2017 | Yanovsky | ......... G06F 17/30197 |

FOREIGN PATENT DOCUMENTS

| JP | 2007183982 A | 7/2007 |
| JP | 2007304962 A | 11/2007 |
| JP | 2011248711 A | 12/2011 |
| JP | 2012008934 A | 1/2012 |

* cited by examiner

Primary Examiner — Matthew Smithers
(74) Attorney, Agent, or Firm — Kunzler, PC

(57) ABSTRACT

The embodiments provide facilitate storage of content from a terminal device in a cloud environment. Storage servers, a front server, and terminal devices are connected to a network. Each terminal device carries out an operation to the front server to store created content. The front server acquires the account of each of the storage servers in advance. The front server splits received content into split files, and stores the split files on different storage servers, respectively. The terminal device requests the front server to download the stored content. The front server acquires the split files from the storage servers, restores the content, and sends the restored content back to the terminal device. The front server encrypts and stores, with a public key of the terminal device, meta information for decrypting the content from the split files.

18 Claims, 4 Drawing Sheets

INFORMATION PROCESSING APPARATUS FOR STORING DATA IN CLOUD ENVIRONMENT, TERMINAL DEVICE, AND STORAGE METHOD

FIELD

The subject matter disclosed herein relates to a technique for improving the information security of content stored in storage devices existing in a network environment, and more specifically, to a technique for improving information security and robustness (tolerance) to a system failure using multiple storage devices protected by their own security systems, respectively.

There is a storage service provider (hereinafter simply called a provider) providing services for storing user data in a cloud environment using a network. A user can use an area, reserved on a storage server managed by the provider, via the network as if it were a local storage device.

SUMMARY

A user may select any cloud storage provider managing a storage server to store data. Typically, a user selects a single provider to store coherent data (content) in a format, such as of document files and images. The storage provider may employ its own security system to protect user content, but content leakage, e.g. content data breaches or illegal access to content, from the provider may occur.

Factors leading to content leakage may include external factors such as storage servers being targeted for attacks from hackers, and internal factors, such as security information (e.g. a password and an ID), being leaked by a person involved with the content. To avoid the content leakage from the provider, the user can encrypt, in advance, the content to be stored before storing the content. Using any method as disclosed in the conventional techniques, the user can also split the content into blocks, so that meaningful information cannot be reproduced from each individual block to store the content on multiple storage servers in a distributed manner.

However, this type of processing impairs a user's convenience of storing the content easily. Further, the user may decide not to perform such processing, based on his trust in the information security system of the provider. Moreover, when a hardware or software failure occurs on a single storage server under the control of the provider, the user may not be able to acquire the content until the failure is recovered.

Therefore, some embodiments described herein provide a method of ensuring the information security of data to be stored in a cloud environment. Some embodiments also provide a method of storing data in a cloud environment while not impairing a user's convenience. Moreover, some embodiments provide a method of improving robustness to system failures in a storage device provided in a cloud environment. Various embodiments include an information processing apparatus, a terminal device, and a computer program for providing such a method.

An embodiment provides a method in which an information processing apparatus stores content, received from a terminal device, in multiple storage devices connected to a network and having different accounts, respectively. The information processing apparatus acquires the accounts of the multiple storage devices. The information processing apparatus receives the content from the terminal device. The information processing apparatus splits the content to generate multiple split files. The information processing apparatus sends the split files to different storage devices, respectively.

In some embodiments, when the terminal device makes a storage request for the content to the information processing apparatus, since the information processing apparatus stores the split files of the content in multiple storage devices having different accounts in a distributed manner, the information security is improved more than a case where they are stored in a storage device having a single account. The multiple storage devices may be provided by different storage service providers, respectively. In this case, the information processing apparatus can use the multiple storage service providers to compensate for the vulnerability of information security of each individual storage service provider.

The information processing apparatus can generate meta information for restoring the content from the multiple split files, and can encrypt and store the meta information with a public key received from the terminal device. As a result, the leakage of the meta information from the information processing apparatus can be eliminated to ensure the security of the content. In this case, the information processing apparatus can send the terminal device the encrypted meta information in response to a content acquisition request received from the terminal device to request decryption, and receive decrypted meta information from the terminal device to restore the content from the multiple split files acquired from the multiple storage devices using the meta information.

The meta information may include the accounts of the multiple storage devices. As the information processing apparatus sends the terminal device the meta information, the terminal device can use the meta information to acquire the multiple split files directly from the multiple storage devices in order to restore the content. Thus, even when a system failure occurs in the information processing apparatus, the terminal device may still be able to acquire the content. The information processing apparatus can create multiple identical split files and store each of the multiple identical split files in a different storage device, respectively. As a result, the split files are made redundant, and hence robustness to a system failure is improved.

An embodiment also provides a method in which a terminal device stores content in a network environment including an information processing apparatus capable of generating split files from the content received from the terminal device and storing the split files in multiple storage devices having different accounts, respectively. The terminal device sends the content to the information processing apparatus to make a storage request, and receives, from the information processing apparatus, meta information for restoring the content from the split files created by the information processing apparatus that received the content in response to the generation of the split files. When the terminal device makes an acquisition request for the content to the information processing apparatus, if the content cannot be acquired from the information processing apparatus, the terminal device will directly access the multiple storage devices using the meta information to acquire the content.

As a result, the terminal device only has to make the storage request to the information processing apparatus to acquire the content even when split files are stored in the storage devices having different accounts in a distributed manner and a system failure occurs in the information processing apparatus. When content cannot be acquired from the information processing apparatus, even after a predetermined time has elapsed since the acquisition request, by the terminal device directly accessing the multiple storage devices, the content can be automatically acquired without any user's special operation to the terminal device.

The meta information may include the accounts of the multiple storage devices. The terminal device can generate a pair of a private key and a public key, and send the public key to the information processing apparatus so that the information processing apparatus will encrypt and store the meta information therewith. As a result, the danger of leakage of the meta information from the information processing apparatus can be eliminated. The terminal device can receive the meta information encrypted with the public key from the information processing apparatus in response to the acquisition request for the stored content. The terminal device can then decrypt the encrypted meta information with the private key, and send the decrypted meta information to the information processing apparatus.

Thus, some embodiments provide a method of ensuring the information security of data to be stored in a cloud environment. Some embodiments also provide a method of storing data in a cloud environment while not impairing a user's convenience. Some embodiments further provide a method of improving robustness to a system failure in a storage device provided in a cloud environment. Moreover, some embodiments include an information processing apparatus, a terminal device, and a computer program providing such a method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings.

DETAILED DESCRIPTION

Figure 1:
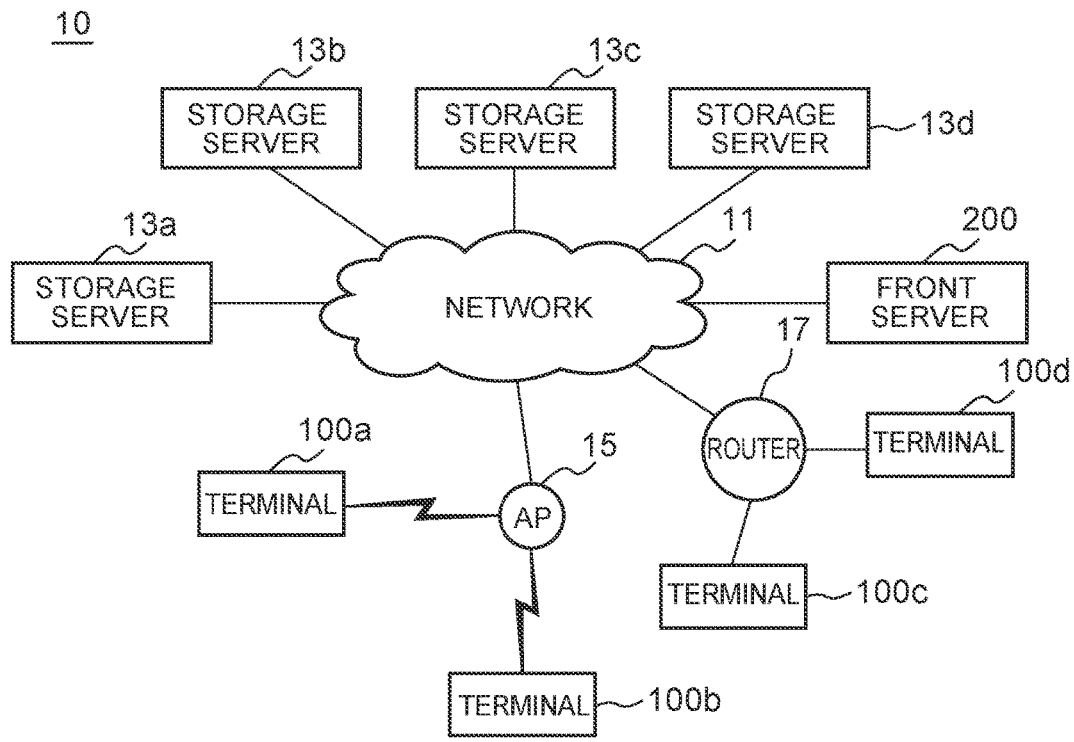
FIG. 1 is a diagram depicting an embodiment of a network system comprising a network, storage servers, and terminal devices.

FIG. 1 depicts an example of a network system 10 of an embodiment. A network 11 can be configured as a complex of a LAN, a WAN, the Internet, a phone line or a network dedicated line, and the like. Storage servers 13a to 13d, a front server 200, a wireless access point (AP) 15 and a wired router 17 are connected to the network 11.

The storage servers 13a to 13d represent a complex of hardware and software for different providers to provide services for storing content using cloud computing technology to users using terminal devices 100a to 100d. Each provider assigns predetermined identifiers (ID) and passwords to users using the storage servers 13a to 13d.

Hereinafter, information including an ID and a password necessary for each of the users to access the storage servers 13a to 13d is called an account. The storage servers 13a to 13d ensure the information security of content to be stored, with a security system unique to each provider. The storage servers 13a to 13d may include a distributed file system comprising multiple storage servers connected to the network. In the distributed file system, content received from any one of the terminal devices 100a to 100d can be redundantly stored in different multiple storage servers.

The security system unique to each provider includes the protection of each user account. Further, in the unique security system, content to be stored may be encrypted or stored using a distributed file system and secret sharing technology. Even with such protection, the storage servers 13a to 13d may be vulnerable to content leakage through internal and external routes.

Even though each of the storage servers 13a to 13d introduces a distributed file system or encrypts content, content leakage may occur if a password with which the unique security system is accessed internally leaks out. The terminal devices 100a and 100b may be, for example, laptop personal computers, tablet terminals, smartphones, and the like, which can access the network 11 via the wireless access point 15.

The terminal devices 100c and 100d may be, for example, desktop personal computers, workstations, or the like, which can access the network 11 via the router 17. Each of the terminal devices 100a to 100d creates content to be stored in a cloud environment. Each of the terminal devices 100a to 100d can acquire an account of any one of the storage servers 13a to 13d to store content. Each of the terminal devices 100a to 100d can acquire an account of the front server 200 to make a storage request for the content.

The front server 200 is a complex of hardware and software for a provider, different from the providers of the storage servers 13a to 13d, to provide a service for storing content using cloud computing technology to the users using the terminal devices 100a to 100d. The front server 200 serves as a front end for the terminal devices 100a to 100d to store data in the cloud environment. In the network 11, the front server 200 provides a portal site for the storage service to the users of the terminal devices 100a to 100d.

The front server 200 can acquire the account of each of the storage servers 13a to 13d to store or read data, as if it were any of the terminal devices 100a to 100d. In an embodiment, the front server 200 stores content received from each of the terminal devices 100a to 100d on the multiple storage servers 13a to 13d, without the front server 200 holding the content. Thus, the front server 200 can minimize the number of storage devices to provide the content storage service.

Figure 2:
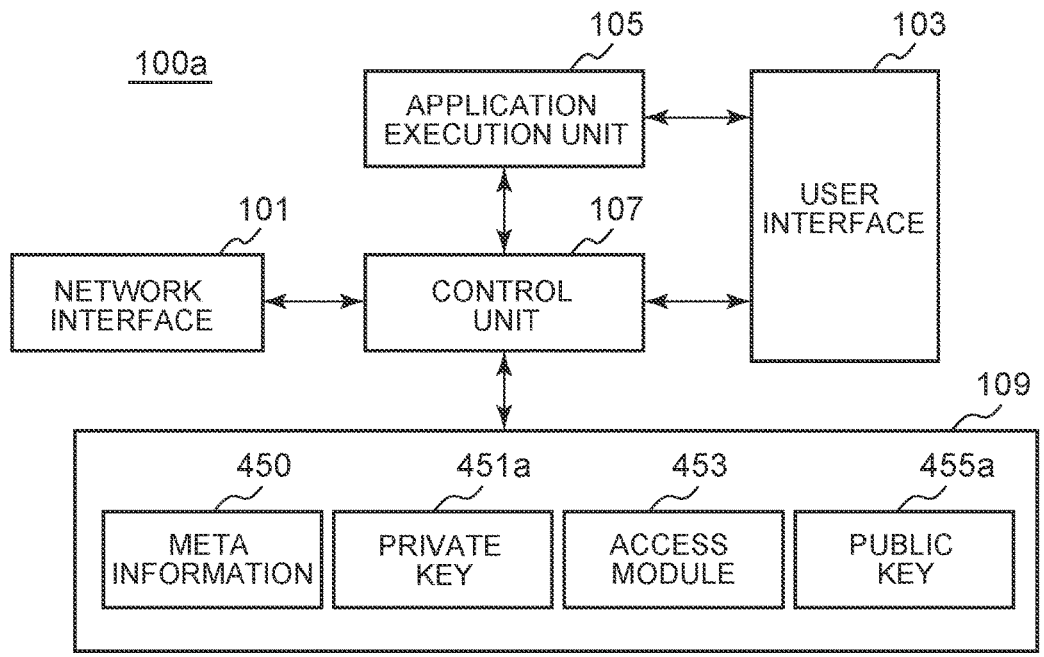
FIG. 2 is a functional block diagram showing an embodiment of the configuration of a representative terminal device.

Terminal devices 100a to 100d may have the same configuration for various embodiments. FIG. 2 is a functional block diagram showing an example configuration of terminal device 100a, which may be representative of the terminal devices 100a to 100d. Terminal device 100a includes a network interface 101, a user interface 103, an application execution unit 105, a control unit 107, and a storage unit 109. Each component of terminal device 100a may be implemented by hardware such as a CPU, a system memory, an I/O chipset, and a peripheral device in cooperation with software such as a device driver, an OS, and an application program executed by the CPU.

Network interface 101 may include a network controller for accessing the network 11 via AP 15 or router 17. User interface 103 may include input/output devices to the user such as a touch panel, a keyboard, a mouse, and a display.

The application execution unit 105 creates content 400 (FIG. 5) to be stored in a cloud environment in cooperation with the user interface 103 in connection with the described embodiments. The control unit 107 controls the operation of the entire terminal device 100a in cooperation with the user interface 103 to store the content 400 created by the application execution unit 105 in the cloud environment and acquire the stored content 400 from the cloud environment. The control unit 107 creates a pair of a private key 451a and a public key 451b (FIG. 3) for encrypting meta information 450.

The storage unit 109 includes an auxiliary storage device, such as an HDD or an SSD, and a controller. The storage unit 109 stores, in a secure area, the meta information 450, the private key 451a, an access module 453, and the public key 455a as needed. The access module 453 is a program executed by the control unit 107 to cause the terminal device 100a to acquire a set of split files from the storage servers 13a to 13d in order to restore the content 400 when a failure has occurred in the front server 200. Note that the access module 453 is generated by the front server 200.

Figure 3:
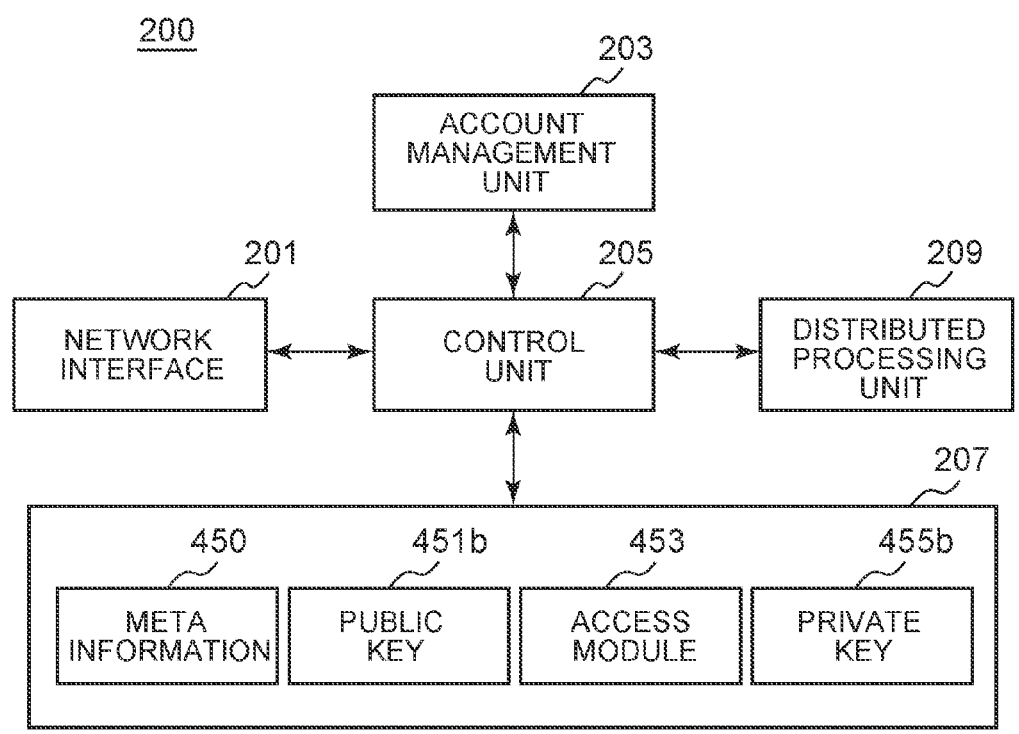
FIG. 3 is a functional block diagram depicting an embodiment of the configuration of a front server.

FIG. 3 is a functional block diagram showing an example configuration of the front server 200. The front server 200 is composed of a network interface 201, an account management unit 203, a control unit 205, a storage unit 207, and split processing unit 209, also referred to in FIG. 3 as distributed processing unit 209. Each component of the front server 200 can be implemented by hardware such as a CPU, a system memory, an I/O chipset, and a peripheral device in cooperation with software such as a device driver, an OS, and an application program executed by the CPU.

The network interface 201 includes a network controller for accessing the network 11. The account management unit 203 acquires the account of any of the storage servers 13a to 13d used for the service of the front server 200, and further assigns an account to each of the terminal devices 100a to 100d and authenticates the terminal device 100a-100d. The account management unit 203 can manage billing data for terminal devices 100a to 100d. The account management unit 203 creates a portal site for providing the content storage service to the terminal devices 100a to 100d.

On the portal site, the grade of service provided by the front server 200 and the amount charged for storage capacity can be presented. The grade of service can include the provider name of a storage server used, the installation place of the storage server, and the redundancy level to be described later. In response to a request from each of the terminal devices 100a to 100d, the control unit 205 performs a series of steps related to the storage of the content 400 using the storage servers 13a to 13d, and the acquisition or return of the content 400 to the terminal device 100a-100d.

The control unit 205 uses a different public key 451b received from each of the terminal devices 100a to 100d to encrypt meta information 450. The storage unit 207 includes an HDD. The storage unit 207 stores the meta information 450 encrypted with the public key 451b, the public key 451b, the access module 453, and the private key 455b as needed. The control unit 205 sends the access module 453 to each of the terminal devices 100a to 100d that acquired an account.

Figure 4:
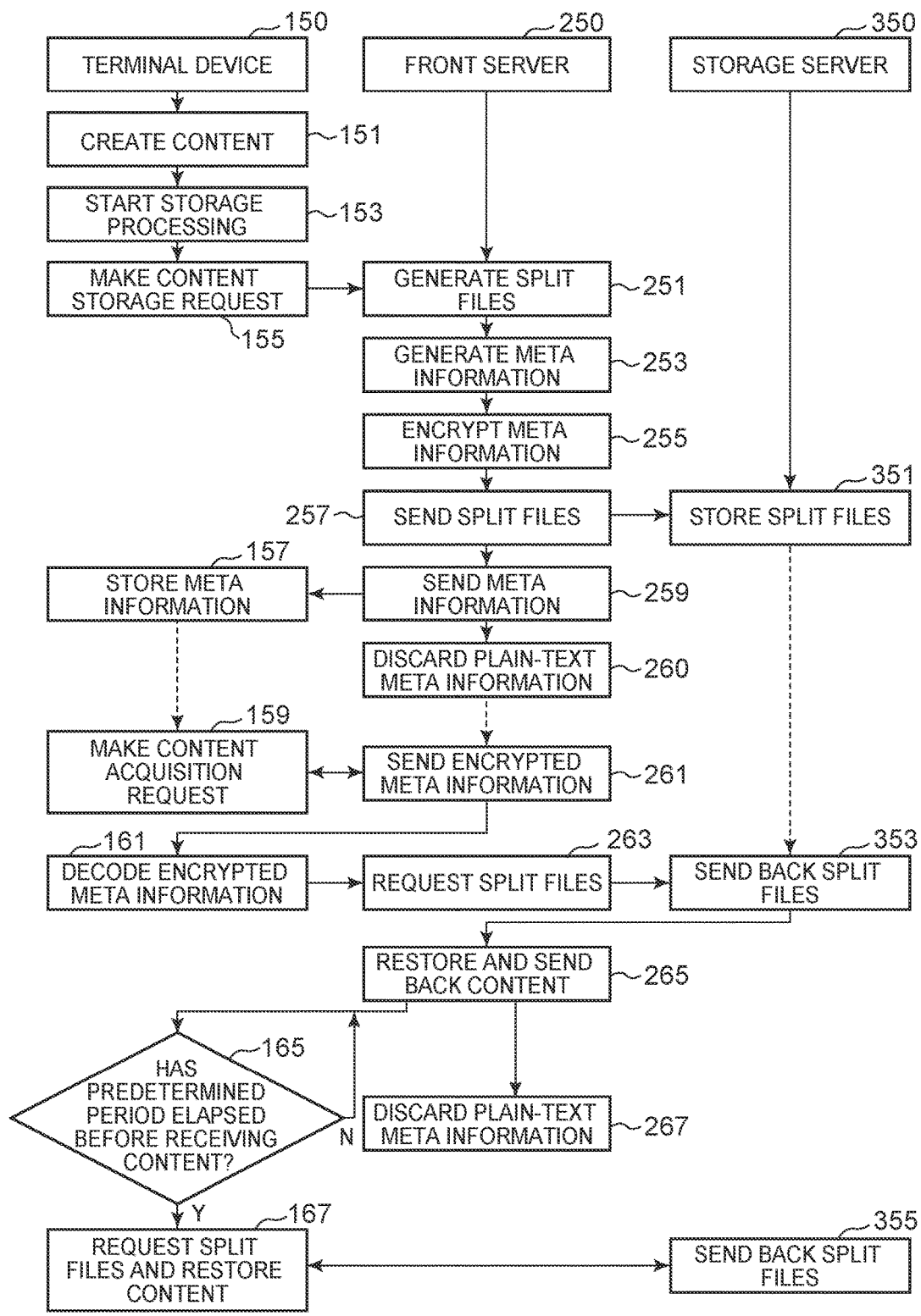
FIG. 4 is a flowchart showing an embodiment of a methods for storing content 400 in the network system.

FIG. 4 is a flowchart showing an example of steps for causing the terminal device 100a to store the content 400 in the network system 10 in a cloud environment. Steps 150 to 167 show a steps for terminal device 100a, steps 250 to 267 show steps for the front server 200, and steps 350 to 355 show steps for the storage servers 13a to 13d.

At step 250, the account management unit 203 has already acquired the accounts of the storage servers 13a to 13d, and has further assigned, to the terminal device 100a, an account for the front server 200. The control unit 205 has already sent the access module 453 to the terminal device 100a. Further, the control unit 205 has already generated a pair of a private key 455b and a public key 455a as needed, stored the private key 455b in the storage unit 207, and sent the public key 455a to the terminal device 100a.

At step 150, the control unit 107 has already generated a pair of a private key 451a and a public key 451b, stored the private key 451a in the storage unit 109, and sent the public key 451b to the front server 200. The access module 453 and the public key 455a received from the front server 200 are stored in the storage unit 109. The public key 451b is stored in the storage unit 207 of the front server 200. At step 350, the storage servers 13a to 13d have already provided a content storage service to the front server 200 assigned an account.

At step 151, the application execution unit 105 creates content 400 of an instruction from a user through the user interface 103. At step 153, the user carries out an operation to the application execution unit 105 for displaying a portal site of the front server 200 to store the content 400. The storage operation is carried out, for example, by dragging the content 400 to be stored onto an icon of the front server 200 displayed on a desktop screen. Note that the user can also acquire the accounts of the storage servers 13a to 13d independently by a conventional method to carry out a direct storage operation.

At step 155, the control unit 107 that received a request from the application execution unit 105 sends the content 400 to the front server 200 to make a storage request. At step 251, in the front server 200 that received the storage request, the account management unit 203 authenticates the terminal device 100a. The control unit 205 sends the split processing unit 209 the content 400 to instruct the split processing unit 209 to generate multiple split files.

As an example, the split processing unit 209 splits the content 400 based on a predetermined algorithm to generate and send, to the control unit 205, a set of split files 400a and 400b made up of two split files. The split processing unit 209 can vary the number M of splits and the splitting method from content to content. For example, in the case of image data in JPEG format, segments affecting the image and the other pieces of data can be made as split files, respectively. Further, when the content is a document file, each byte of data that constitutes the content can also be split into four-bit segments.

Figure 5:
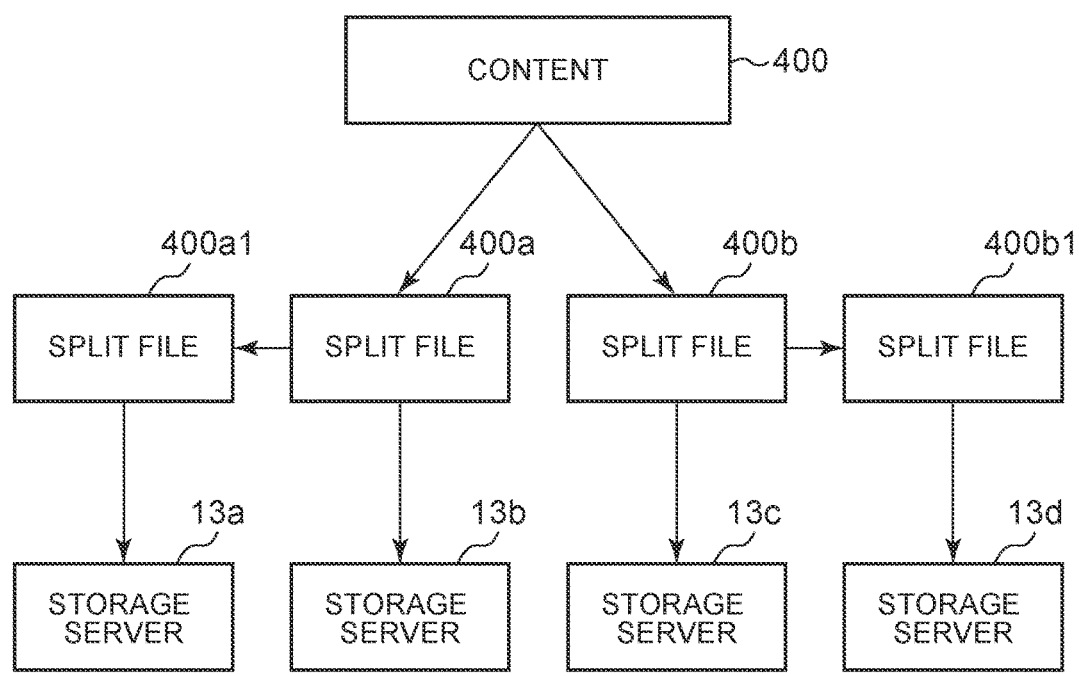
FIG. 5 is a diagram depicting a method of storing split files obtained by splitting content across a plurality of storage servers.

Here, merely as an example, it is assumed that the split processing unit 209 splits the content 400 into two segments simply at the center of the physical data array as shown in FIG. 5 to generate a set of split files 400a and 400b. At step 253, the control unit 205 that received the set of split files 400a and 400b determines a redundancy level of the content 400 to determine the number of storage servers used. Here, as an example, it is assumed that the redundancy level N (N>1) is set to 2. The redundancy level corresponds to the number of identical split files, meaning that the split files can be acquired even if system failures occurs on N−1 storage servers.

As an example, from the selected number of splits, M=2, and the redundancy level N=2, the control unit 205 calculates, from S=M×N, the number S of storage servers used, which, in this example would be 4. The control unit 205 copies the split files 400a to generate a split file 400a1 and copies the split files 400b to generate a split file 400b1 in order to make each of the split files 400a and 400b have the number of identical copies corresponding to the redundancy level N, e.g. 2 in this example.

Note that any of techniques in secret sharing technology may allow the restoration of the original content even if all split files are not gathered. For example, when the number M of splits is set to 3 to store the split files on three different storage servers, even if a system failure occurs on one storage server, the content can be restored from the remaining split files using such a technique. The embodiments described may combine such a secret sharing technique with copying of the identical split files to ensure redundancy.

The control unit 205 acquires, from the account management unit 203, the accounts of the four storage servers 13a to 13d that store the four split files 400a, 400a1, 400b, and 400b1 to create meta information 450. The meta information 450 corresponds to information necessary to access the storage servers 13a to 13d and acquire a set of split files necessary for restoration in order to restore the content 400.

The meta information 450 includes the accounts of the storage servers 13a to 13d, allocation information indicative of the correspondences of split files 400a, 400a1, 400b, and 400b1, restoration information indicative of a method of restoring the content 400 from the set of split files, and the like. If plain-text meta information 450 leaked out, content 400 could be acquired illegally from the storage servers 13a to 13d. Therefore, control unit 205 encrypts the meta information 450 at step 255 with the public key 451b received from the terminal device 100a. The control unit 205 stores the encrypted meta information 450 associated with the account and an identifier of the content 400, in storage unit 207.

At steps 257 and 351, the control unit 205 uses the meta information 450 to store the split files 400a, 400a1, 400b, and 400b1 in storage servers 13a to 13d respectively in a distributed manner. At step 259, the control unit 205 sends the terminal device 100a the meta information 450 encrypted with the public key 451b. At step 260, the control unit 205 discards plain-text meta information 450. Thus, front server 200 stores the encrypted meta information 450 in the storage unit 207, but does not hold plain-text meta information 450 in any way.

At step 157, the control unit 107 stores, in the storage unit 109, the received meta information 450 associated with the identifier of the content 400. When a system failure occurs on the front server 200, the terminal device 100a directly accesses the storage servers 13a to 13d based on this meta information 450 to acquire and use the set of split files in order to restore the content 400. At this step in the method, the storage of the content 400 created by the terminal device 100a for the cloud environment is completed.

At step 159, the user of the terminal device 100a instructs the application execution unit 105 displaying the portal site to download the content 400 from the front server 200 through the user interface 103. The control unit 107 that received the instruction from the application execution unit 105 accesses the front server 200 to download a content list corresponding to its own account. The user selects the content 400 from the content list and instructs the control unit 107 to download the content 400. When the control unit 107 makes an acquisition request for the content 400 to the front server 200, at step 261, the control unit 205 responds to the request and extracts encrypted meta information 450 corresponding to the account of the terminal device 100a and the identifier of the content 400 from the storage unit 207, and sends the meta information 450 to the terminal device 100a to make a decryption request.

At step 161, the control unit 107 that received the encrypted meta information 450 uses the private key 451a stored in the storage unit 109 to send decrypted plain-text meta information 450 back to the front server 200. At step 263, the control unit 205 that received the decrypted plain-text meta information 450 accesses each of the storage servers 13a to 13d to acquire a set of split files.

Alternatively, the control unit 107 can also send meta information 450 encrypted with the public key 455a received from the front server 200 back to the front server 200. In this case, the control unit 205 decrypts the meta information 450 using the private key 455b created by itself, and accesses each of the storage servers 13a to 13d to acquire the set of split files.

The control unit 205 can determine the order to access storage servers 13a to 13d in advance. At step 353, each of the storage servers 13a to 13d sends each of the stored split files 400a, 400a1, 400b, and 400b1 back to the front server 200. Once a set of split files sufficient to restore the content 400 are acquired, the control unit 205 can cancel access to the remaining storage servers. For example, when a set of split files 400a and 400b1 can be acquired from the storage servers 13b and 13d, the control unit 205 does not need to access the storage servers 13b and 13c.

At step 265, the control unit 205 acquires the set of split files 400a and 400b1 from the storage servers 13b and 13d, for example. Further, the control unit 205 sends the content 400 restored using the meta information 450 back to the terminal device 100a. When determining that a set of split files necessary to restore the content 400 cannot be acquired due to a system failure in the network 11 or on the storage servers 13a to 13d, the control unit 205 notifies the terminal device 100a of that effect.

At step 267, the control unit 205 discards plain-text meta information 450 received from the terminal device 100a or plain-text meta information 450 decrypted with the private key 455b. At step 165, the control unit 107 clocks the elapsed time after the acquisition request for the content 400 at step 159. When receiving, from the front server 200, a notification that the content 400 cannot be sent back, the control unit 107 can cancel the processing at the time. When a system failure occurs on the front server 200, the control unit 107 may not receive any response to the acquisition request for the content 400 at all from the front server 200.

Even when there is no response within a predetermined period due to the occurrence of a system failure on the front server 200, the control unit 107 can acquire the content 400 potentially by directly accessing the storage servers 13a to 13d. When there no response from the front server 200 after a predetermined time has elapsed, the control unit 107 executes the access module 453 taken out of the storage unit 109 at step 167. The control unit 107 uses the meta information 450 to access the storage servers 13a to 13d directly and download the set of split files in order to restore the content 400. At step 355, the storage servers 13a to 13d sends the set of split files back to the terminal device 100a directly accessing thereto with the account assigned to the front server 200.

The above-mentioned methods are just example embodiments, and the scope of the embodiments is not limited thereto. Therefore, all of the steps in the embodiments are not necessarily required for various embodiments, and the order of steps may also be changed without departing from the scope of the embodiments. For example, a predetermined effect of the some embodiments may be obtained without executing method steps 165 and 167, unless a system failure occurs on the front server 200. Further, even when split files are stored on the storage servers 13a to 13d in a distributed manner without making the split files redundant, a predetermined effect of the described embodiments may be obtained. Further, the public key 451b and the access module 453 may be sent at predetermined timing of starting the method step 151.

The example of encrypting meta information 450 by the encryption method using a public key is shown above, but an encryption method using a common key may also be employed. Further, the example of storing the meta information 450 in the storage unit 109 of the terminal device 100a and the storage unit 207 of the front server 200, but the meta information 450 may also be stored in a different location accessible through the network 11. Further, the pair of the private key 451a and the public key 451b, and the pair of the private key 455b and the public key 455a may be created for each content.

The front server 200 can strengthen information security for content 400 and robustness to a system failure by the method described in the embodiment mentioned above, compared with a case where the terminal device 100a stores the content 400 directly on the storage servers 13a to 13d. First, in the aspect of information security, the front server 200 stores content 400 in the format of split files on multiple storage servers 13a to 13d in a distributed manner. In this state, even if a split file is leaked from any one of the storage servers, the content 400 will be never restored. Even if an attacker illegally acquires all the split files 400a, 400a1, 400b, and 400b1 or a set of split files necessary for restoration from each of the storage servers 13a to 13d, the content 400 cannot easily be restored unless the meta information 450 is acquired.

In addition, the success of an attack on multiple storage servers 13a to 13d with different security systems is much more difficult for the attacker than an attack on a single storage server. The meta information 450 is encrypted with the public key 451b and stored in the storage unit 207 of the front server 200. Even if the front server 200 is attacked and the encrypted meta information 450 is leaked out, the attacker cannot restore the content 400 unless the private key 451a of the terminal device 100a is leaked out.

In other words, the security of the content 400 can be ensured even if data stored on front server 200 or the storage servers 13a to 13d are leaked out as long as the terminal device 100a ensures the security of the private key 451a. In this regard, it can be said that the security of each provider related to the storage of the content 400 is improved to the security level of the terminal devices 100a to 100d in cooperation between the front server 200 and the terminal devices 100a to 100d.

Next, in the aspect of robustness to a system failure, even when system failures of a predetermined number of storage servers 13a to 13d occur, the front server 200 can restore the content 400. Specifically, when either one of the storage servers 13a, 13b and either one of the storage servers 13c, 13d are normal, the front server 200 or the terminal device 100a can restore the content 400 even if system failures occur on two storage servers.

When a system failure occurs on any one of the storage servers 13a to 13d, the content 400 can be restored. Further, even when a system failure occurs on the front server 200, the terminal devices 100a to 100d can directly access the storage servers 13a to 13d to acquire the content 400 as long as a predetermined number of storage servers operate normally.

The front server 200 having the above-mentioned features can provide a new storage service to the users of the terminal devices 100a to 100d. The front server 200 does not need to have robustness to a system failure stronger than that of a single storage server 13a to 13d. Further, the front server 200 does not need to have information security higher than that of the storage servers 13a to 13d. However, the front server 200 strengthens the information security and robustness of the system by using the storage servers 13a to 13d provided by existing providers on the background of the terminal devices 100a to 100d.

The terminal device 100a does not need to generate a set of split files 400a, 400b, perform redundancy processing on the split files to store the split files in a distributed manner, or encrypt the content 400 in order to strengthen the information security and robustness of the content 400. Further, the access module 453 does not need to be prepared by the terminal device 100a because it is downloaded from the front server 200. The user of the terminal device 100a may be or may not be aware that the content 400 is stored on the storage servers 13a to 13d in a split state, and the user only has to perform, on the front server 200, almost the same steps as the steps for storing content on any one of storage servers.

Even when a system failure occurs on the front server 200, the control unit 107 executing the access module 453 in each of the terminal devices 100a to 100d can automatically access the storage servers 13a to 13d to acquire the content 400. The users of the terminal devices 100a to 100d do not need to be aware of for which provider the front server 200 stores the content. When charging occurs in terms of the storage of content, the providers of the storage servers 13a to 13d charge the front server 200 therefor so that the provider of the front server 200 can charge the terminal devices 100a to 100d therefor.

While the detailed description refers to the specific embodiment shown in the drawings, other embodiments not shown in the drawings may be within the scope of the claims. As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products of embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products of various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

What is claimed is:

1. A method comprising:
    acquiring at an information processing apparatus, accounts of a plurality of storage devices connected to a network and having different accounts, respectively;
    splitting content received from a terminal device to generate a plurality of split files;
    sending the plurality of split files to respectively different ones of the plurality of storage devices;
    generating meta information for restoring the content from the plurality of split files;
    encrypting the meta information with a public key received from the terminal device; and
    sending the encrypted meta information to the terminal device in response to an acquisition request for the content received from the terminal device.
2. The method of claim 1, wherein the plurality of storage devices is selected from the group consisting of storage devices provided by different storage service providers, and storage devices provided by the same storage service provider.
3. The method of claim 2, further comprising:
    storing the encrypted meta information.
4. The method of claim 3, further comprising:
    receiving decrypted meta information from the terminal device; and
    restoring the content from the plurality of split files acquired from the plurality of storage devices by using the decrypted meta information.
5. The method of claim 3, wherein the meta information includes the accounts of the plurality of storage devices.
6. The method of claim 5, further comprising:
    managing billing data for the accounts;
    acquiring the storage service provider charges for the terminal device for storage in the plurality of storage devices; and
    providing the charges to the terminal device.
7. The method of claim 3, further comprising:
    creating a portal site for the terminal device;
    presenting via the portal site at least one of: grade of service; names of storage service provider used; installation place of storage servers used; and redundancy level.
8. The method of claim 7, wherein the step of creating a plurality of identical split preceded by determining a redundancy level corresponding to the number of the plurality of identical split files to be stored.
9. The method of claim 3, further comprising sending to the terminal device a program for restoring the content by acquiring the plurality of split files directly from the plurality of storage devices using the meta information.
10. The method of claim 1, further comprising creating a plurality of identical split files; and storing the plurality of identical split files to different ones of the plurality of storage devices, respectively.
11. A method comprising:
    sending terminal device content, to an information processing apparatus capable of generating split files and of storing the split files in a plurality of storage devices having different accounts, respectively, to make a storage request;
    receiving, from the information processing apparatus at the terminal device, meta information for restoring the content from the split files created by the information processing apparatus that received the content in response to the generation of the split files;
    making an acquisition request from the terminal device for the content to the information processing apparatus; and
    directly accessing the plurality of storage devices using the meta information to acquire the content in response to a condition under which the content cannot be acquired from the information processing apparatus.
12. The method of claim 11, wherein the meta information includes the accounts of the plurality of storage devices.
13. The method of claim 12, further comprising:
    causing the terminal device to receive meta information encrypted with the public key from the information processing apparatus in response to the content acquisition request; and
    decrypting the encrypted meta information with the private key and sending the decrypted meta information to the information processing apparatus.
14. The method of claim 11, further comprising:
    generating a pair of a private key and a public key;
    storing the private key; and
    sending the public key used to encrypt and store the meta information, to the information processing apparatus.
15. The method of claim 11, wherein the direct access to acquire the content is made in response to a condition under which the content cannot be acquired from the information processing apparatus after a predetermined time has elapsed since the content acquisition request.
16. An apparatus comprising:
    an account management unit configured to acquire accounts to access a plurality of storage devices provided by respectively different providers through a network;
    a split processing unit for splitting content received from a terminal device to generate split files; and
    a control unit for storing the split files in respectively different storage devices of the plurality of storage devices;
    a storage unit configured to store information in a secure area, wherein the storage unit further comprises encrypted meta information to enable the apparatus to restore the content from the split files;
    wherein the encrypted meta information is sent to the terminal device in response to an acquisition request for the content received from the terminal device.

17. The apparatus of claim 16, wherein the storage unit further comprise an access module corresponding to the terminal device and configured to enable the terminal device to directly acquire and restore content from the split files.

18. The apparatus of claim 16, further comprising a portal site configured to provide storage service account information to the terminal device, the storage service information including at least one of: amount charge for storage capacity; grade of service; names of storage service provider used; installation place of storage servers used; and redundancy level.

* * * * *